(12) United States Patent
Walton et al.

(10) Patent No.: US 8,872,813 B2
(45) Date of Patent: Oct. 28, 2014

(54) PARALLAX IMAGE AUTHORING AND VIEWING IN DIGITAL MEDIA

(75) Inventors: Robert Benson Walton, San Francisco, CA (US); Daniel Alan Wabyick, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 549 days.

(21) Appl. No.: 13/225,158

(22) Filed: Sep. 2, 2011

(65) Prior Publication Data

US 2013/0127826 A1 May 23, 2013

(51) Int. Cl.
| | |
|---|---|
| G06T 15/00 | (2011.01) |
| G06T 19/20 | (2011.01) |
| G06F 3/0481 | (2013.01) |
| G06F 3/0488 | (2013.01) |

(52) U.S. Cl.
CPC ............ *G06T 19/20* (2013.01); *G06F 3/04815* (2013.01); *G06T 2219/2004* (2013.01); *G06F 3/0488* (2013.01); *H04N 2213/006* (2013.01)
USPC ........................................................ 345/419

(58) Field of Classification Search
CPC ................................. G06T 19/00; G06T 17/20
See application file for complete search history.

(56) References Cited

U.S. PATENT DOCUMENTS

| | | | |
|---|---|---|---|
| 7,952,777 B2 | 5/2011 | Nishiwaki | |
| 7,961,983 B2 | 6/2011 | Uyttendaele et al. | |
| 7,967,205 B2 | 6/2011 | Pankow et al. | |
| 7,974,007 B2 | 7/2011 | Jung | |
| 2002/0035697 A1* | 3/2002 | McCurdy et al. | 713/200 |
| 2009/0132441 A1* | 5/2009 | Muller et al. | 706/11 |
| 2011/0157155 A1* | 6/2011 | Turner et al. | 345/419 |
| 2011/0157337 A1 | 6/2011 | Chang | |
| 2011/0164032 A1 | 7/2011 | Shadmi | |
| 2011/0164111 A1 | 7/2011 | Karaoguz | |
| 2011/0167110 A1 | 7/2011 | Hoffberg et al. | |

OTHER PUBLICATIONS

Gibbs, Samuel, iPad 2 gets glasses-free 3D display using front-facing camera for head tracking, http://www.tuaw.com/2011/04/11/ipad-2-gets-glasses-free-3d-display-using-front-facing-camera-fo/, Apr. 11, 2011.

Flash—Parallax Background Creator XML—AcitveDen, http://activeden.net/item/parralax-background-creator-xml/149615, Jul. 8, 2011.

* cited by examiner

*Primary Examiner* — Edward Martello
(74) *Attorney, Agent, or Firm* — Wolfe-SBMC

(57) ABSTRACT

An authoring tool assigns a first depth value to a first image layer and a second depth value to a second image layer. The first depth value is a first simulated distance from a user. The second depth value is a second simulated distance from the user. The authoring tool composes an image based on the first image layer and the second image layer such that the image is displayed within a page in a scrollable area on a viewing device. The first depth value is utilized to generate a first offset value from a first static position of the first image layer and the second depth value is utilized to generate a second offset value from a second static position of the second image layer based upon a scroll position of the page with respect to a target location in the scrollable area to create a parallax effect.

20 Claims, 14 Drawing Sheets

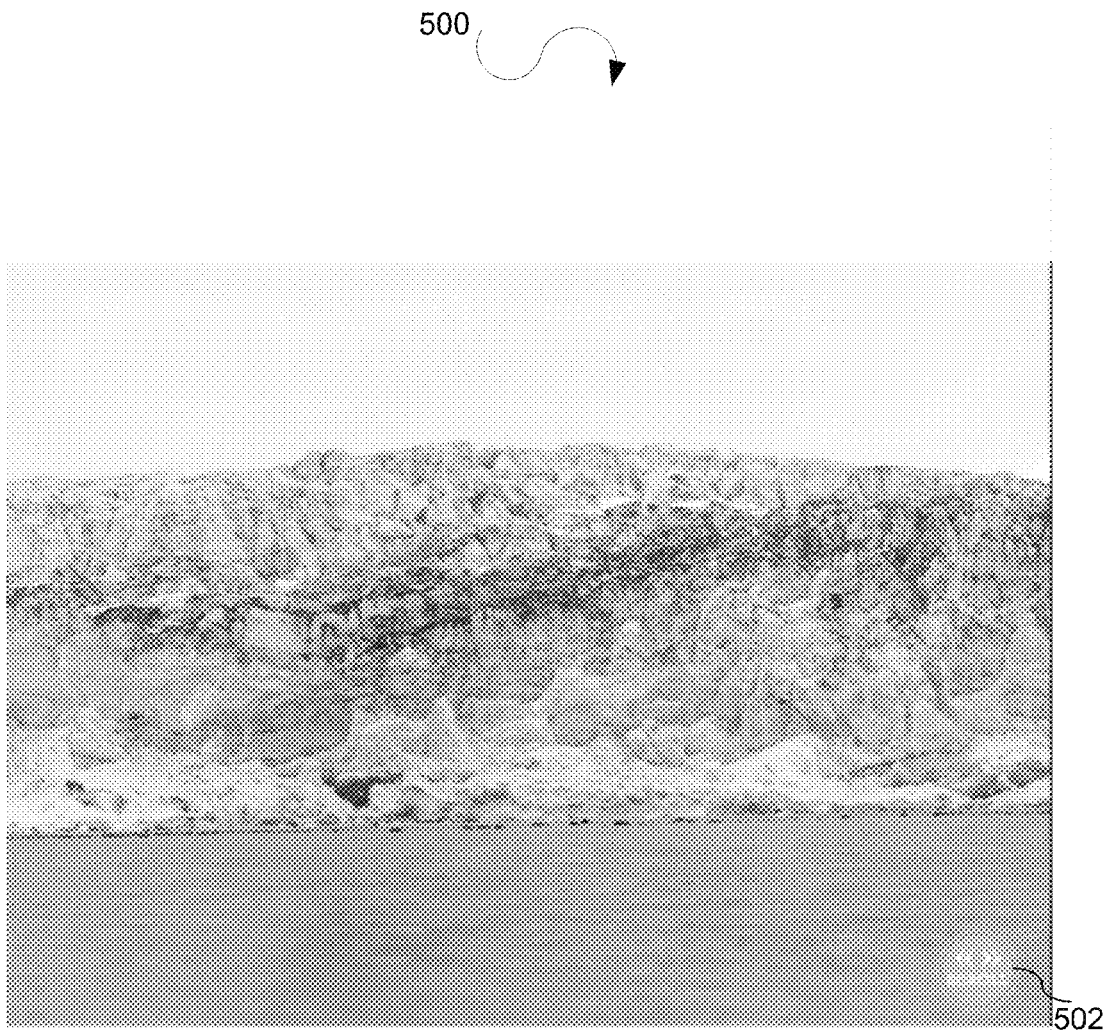

Tap, then scroll left and right for panoramic view of Alaska's most active glacier.

CHILDS GLACIER
The U.S. Forest Service maintains a pristine public recreation area
Across the river from this spectacular 300-foot glacier, which is
reputed to be the most active glacier in Alaska. Chunks of ice-some
of them the size of freighters –calve off intermittently, causing
Waves, occasionally as high as 20 feet, to crest across the river.

*story continues* »

*Figure 5A*

PARALLAX IMAGE AUTHORING AND VIEWING IN DIGITAL MEDIA

FIELD

This disclosure generally relates to image authoring. More particularly, the disclosure relates to parallax image authoring.

BACKGROUND

The advent of interactive digital reading experiences has provided for the possibility of bringing the visual richness of print layouts onto touchscreen devices. Although touchscreen devices provide potential for interactivity, many current touchscreen configurations provide a very similar experience to a digital magazine reader as a print publication. Although touchscreen devices provide intuitive scroll gestures for moving through graphically designed reading content, e.g., web pages, magazine pages, etc., interaction cues are currently limited to underlined text, or animations that draw the eye to a control, but distract from the actual reading experience, e.g. typical web page ads.

Further, current traditional tools for authoring digital reading experiences may contain depth-layer information, e.g., simple z-order in three dimensions ("3D") to structure the static layout of a document, e.g., by utilizing layers in an image authoring tool, but do not leverage this information to provide any additional functionality in the context of a simple two dimensional ("2D") scroll gesture such as that used in a scrollable area on a touchscreen device or a window on a traditional computer display.

SUMMARY

In one aspect of the disclosure, a computer program product is provided. The computer program product includes a computer useable medium having a computer readable program. The computer readable program when executed on a computer causes the computer to assign, with an authoring tool, a first depth value to a first image layer. The first depth value is a first simulated distance from a user. Further, the computer readable program when executed on the computer causes the computer to assign, with the authoring tool, a second depth value to a second image layer. The second depth value is a second simulated distance from the user. In addition, the computer readable program when executed on the computer causes the computer to compose, with the authoring tool, an image based on the first image layer and the second image layer such that the image is displayed within a page in a scrollable area on a viewing device. The first depth value is utilized to generate a first offset value from a first static position of the first image layer, and the second depth value is utilized to generate a second offset value from a second static position of the second image layer based upon a scroll position of the page with respect to a target location in the scrollable area to create a parallax effect. The computer readable program when executed on the computer causes the computer to store the first image layer, the second image layer, the first depth value, and the second depth value on a storage device.

In another aspect of the disclosure, a process is provided. The process assigns, with an authoring tool, a first depth value to a first image layer, the first depth value being a first simulated distance from a user. Further, the process assigns, with the authoring tool, a second depth value to a second image layer, the second depth value being a second simulated distance from the user. In addition, the process composes, with the authoring tool, an image based on the first image layer and the second image layer such that the image is displayed within a page in a scrollable area on a viewing device. The first depth value is utilized to generate a first offset value from a first static position of the first image layer, and the second depth value is utilized to generate a second offset value from a second static position of the second image layer based upon a scroll position of the page with respect to a target location in the scrollable area to create a parallax effect. The process also stores the first image layer, the second image layer, the first depth value, and the second depth value on a storage device.

In yet another aspect of the disclosure, a system is provided. The system includes an authoring tool that (i) assigns a first depth value to a first image layer and a second depth value to a second image layer and (ii) composes an image based on the first image layer and the second image layer such that the image is displayed within a page in a scrollable area on a viewing device. The first depth value is a first simulated distance from a user. The second depth value being a second simulated distance from the user. The first depth value is utilized to generate a first offset value from a first static position of the first image layer, and the second depth value is utilized to generate a second offset value from a second static position of the second image layer based upon a scroll position of the page with respect to a target location in the scrollable area to create a parallax effect. The system also includes a storage device that stores the first image layer, the second image layer, the first depth value, and the second depth value on a storage device.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3A illustrates a composed image, which may be displayed on the viewing device illustrated in FIG. 1, that includes the individual layers illustrated in FIGS. 2A-2C.

FIG. 3B illustrates a composed image with measurement annotations.

FIG. 3C illustrates an image layer depth configuration, which may be displayed on the viewing device illustrated in FIG. 1, that includes an image layer depth window.

FIG. 4A illustrates a parallax effect generated by a scroll movement of the composed image to the right of the viewport in the scrollable area.

FIG. 4B illustrates a parallax effect generated by a scroll movement of the composed image further to the right of the viewport in the scrollable area than illustrated in FIG. 4A.

FIGS. 5A-5C illustrate a variety of other actions that may be performed with a composed image.

FIG. 5A illustrates the composed image that provides an interactivity cue that indicates an interactive image layer.

FIG. 5B illustrates a zoomed version of the composed image illustrated in FIG. 5A.

FIG. 5C illustrates a shrunken version of the composed image illustrated in FIG. 5A.

DETAILED DESCRIPTION

A parallax image authoring system is provided that allows an author to compose parallax images for digital media. The term parallax refers to the rendering of images that simulate 3D scenes by moving layers of an image at different rates. The parallax image authoring system provides the parallax effect for utilization with a variety of design tools. Layers of an image or scene are given different depths that each correspond to their simulated distance from the viewer. The composed images may then be added to the digital media. An example of digital media is a digital magazine. As the digital magazine content is scrolled across the screen, e.g., a user moving touching a tablet and sliding his or her touching finger, the parallax effect would occur, which creates the illusion of a 3D perspective. When the user releases the scroll, e.g., he or she removes his or her finger, the content may go back its resting position without in which there is no parallax.

Figure 1:
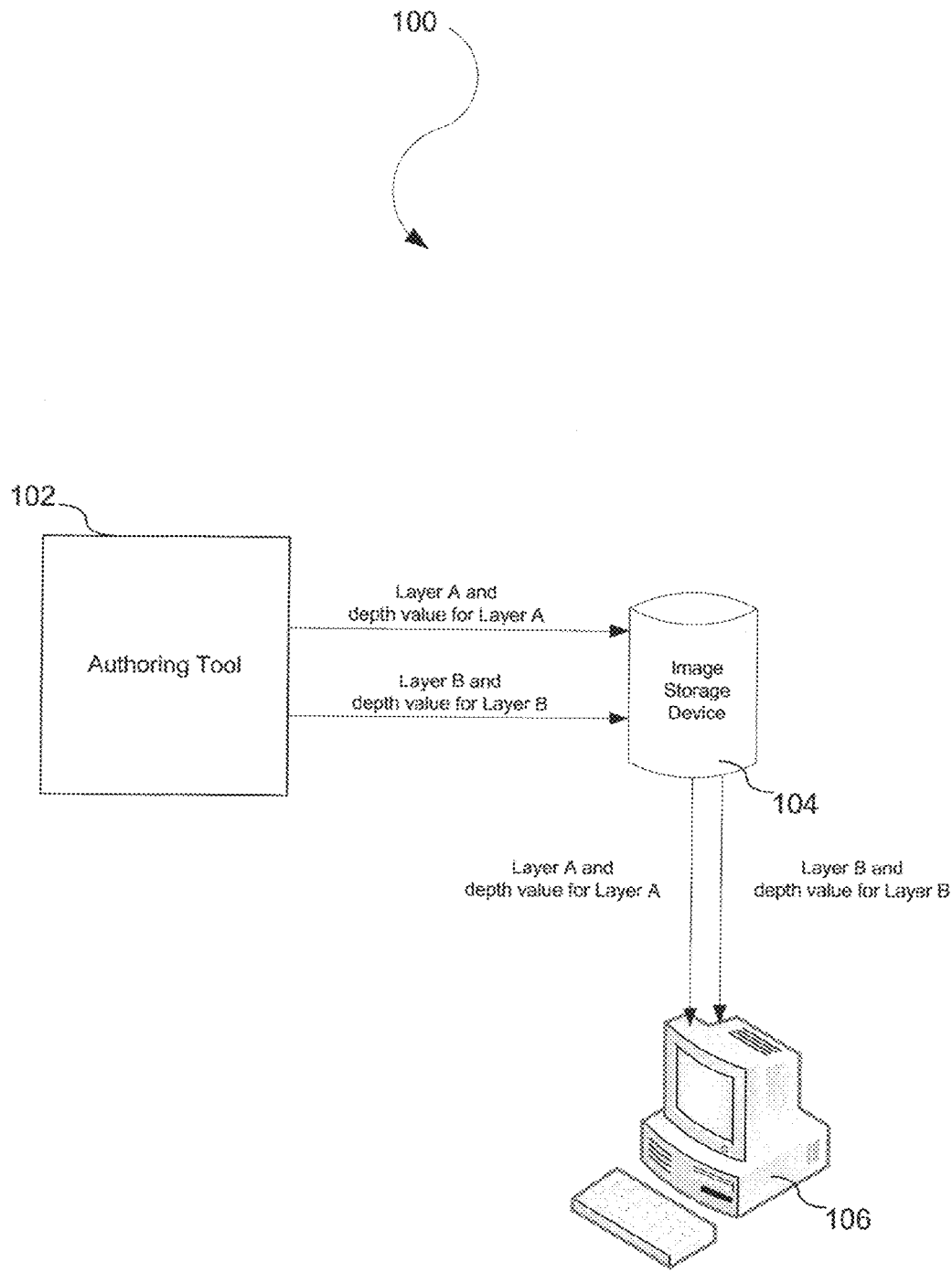
FIG. 1 illustrates a parallax image authoring system.

FIG. 1 illustrates a parallax image authoring system 100. The parallax image authoring system 100 includes an authoring tool 102, an image storage device 104, and a viewing device 106.

The authoring tool 102 may be a program that is utilized to compose, edit, and/or perform other actions on an image. In one embodiment, the authoring tool 102 may receive layers of an image for composition. In another embodiment, the authoring tool 102 may generate the individual layers and then compose those layers into an image. In other words, the authoring tool 102 supports authoring images composed from multiple layers. The authoring tool 102 may take a single image and split it into layers or use multiple images that are composited together.

As an example, the authoring tool 102 may compose an image based on a first image layer and a second image layer by assigning a first depth value to the first image layer and a second depth value to the second image layer. The example utilizes two layers only for ease of explanation as the authoring device may compose an image based on more than two layers. In one embodiment, the first depth value is a first simulated distance of the first image layer from a user and the second depth value is a second simulated distance of the second image layer from the user. The simulated distance is utilized to offset the image layer from its pre-assigned position depending on the scroll position of the page in the scrollable area. A simulated distance may be a predetermined distance. For example, the predetermined distance may be two feet as many computer users may read a digital magazine from a distance of two feet. The term simulated distance is intended to indicate that the user may not be at the distance, but that the user may be in the approximate range of the simulated distance. The 3D scene is built such that the 3D scene unfolds behind the screen. Further, the simulated distance is utilized to offset the image layer from its pre-assigned position depending on the scroll position of the page in the scrollable area. Further, in one embodiment, the simulated distance may be measured along the z-axis. In other words, a viewing screen may be configured according to an x-axis and a y-axis, which would allow for the simulated distance between a user and a layer to be measured along a z-axis. Various other axes may be utilized for the simulated distances.

In one embodiment, each layer may have different depth values. A depth value may enable an indicator to the user. An indicator, e.g., an icon, at a depth value may provide an indication to the user when the image is scrolled. For example, when the image is scrolled, an icon at a particular layer may move at a different rate than other layers. Since human beings perceive motion more easily when the user manipulates, e.g., scrolls, the image, that icon is called out. For example, a depth value may indicate interactive content, non-interactive content, a metatextual visual cue, or the like. In one embodiment, the first image layer has a distinct first depth value from the second image layer that has a second depth value. As a result, a user may be able to be informed that different layers provide different types of functional abilities and/or information to the user. In configurations with more than two layers, a subset of a plurality of layers may potentially have different or the same depth values. For example, two of five layers may have the same depth value such that those layers both provide interactivity.

Further, in one embodiment, the depth values also allow a user to move different layers over other layers. For example, if the second image layer is deeper than the first image layer, the second image layer may be moved under the first image layer such that the first image layer would at least partially, if not fully, cover the second image layer.

After the depth value for each layer is set, that information, along with the layers, is stored. In one embodiment, the depth values and corresponding layers of the image are stored in an image storage device 104. The image storage device may be a memory device, flash drive, tape drive, floppy drive, hard disk drive, compact disk ("CD") drive, or the like. The data may be stored in various image file formats. Alternatively, the data may be stored in a folder that includes the layers and an Extensible Markup Language ("XML") manifest that stores the depth value for each layer image.

A viewing device 106 allows a user to display the layer images in a manner that reflects their corresponding depth values. The viewing device 106 may move the layers at different rates as the image moves across the screen of the viewing device 106, which generates the parallax effect. If the parallax image is zoomed, the image layers are then also zoomed.

The exact positions and sizes of the layers may be determined by multiplying the position and size of the image layer by a coefficient based on the depth value. Alternatively, the layers may be placed in a 3D Application Programming Interface ("API"). In such a configuration, the parallax effect is generated by either moving all layers at the same time or moving the projection center of the scene, i.e., moving a camera across or through a scene.

If the layers are placed in a 3D and API depth values are provided to the corresponding layers, the layers may appear smaller because the 3D API shows them as farther from the camera. Accordingly, the image layers may be scaled up according to a scale factor accordingly so that the image layers appear at their original size despite their depth in the scene.

The viewing device 106 may be any type of general purpose computing device such as a tablet device, magazine viewer, e-book reader, Internet-connected TV, smart phone, personal computer ("PC"), laptop, notebook, or the like. As an example, with respect to a magazine viewer, the parallax effect is applied proportionally to a parallax image based on the onscreen position of the image. Accordingly, if an image is scrolled left or right, the image layers shift as if the user has stepped to the left or right. If the image is scrolled up and down, the layers shift as if the user has moved up or down. If the image is zoomed, the image layers grow and shrink as if the user has moved closer to or further from the scene.

Accordingly, the parallax image authoring system 100 may generate 3D images that are more visually impactful than current configurations and provide a more immersive and engaging reading experience than provided for by current configurations. Further, the parallax image authoring system 100 may provide helpful visual cues for interactivity. For example, if an image is pannable or zoomable beyond what is displayed in a magazine layout, e.g., a background beyond a magazine page, the image may appear to have depth, which suggests that more information is available for exploration if an input, e.g., a tap, to the image is provided. Another example involves visual icons or calls to action that appear on top of interactive elements in a digital magazine. The visual icons or calls to action may appear at different depths than the content itself, which suggests they visual icons or calls to action are not part of the content itself, but rather a metatextual visual cue. An example of a call to action is a text box asking the user to provide an input.

Figure 2A:
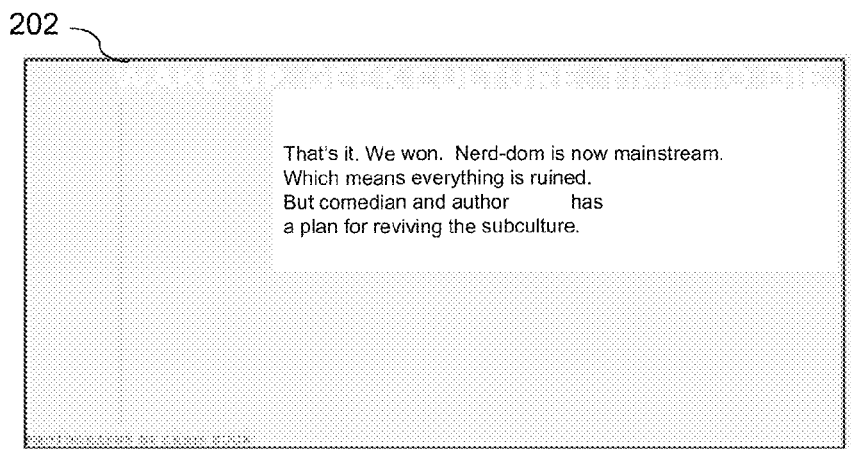
FIGS. 2A-2C illustrate examples of various image layers that may be received and/or generated by the authoring tool 102 illustrated in FIG. 1.
Figure 2B:
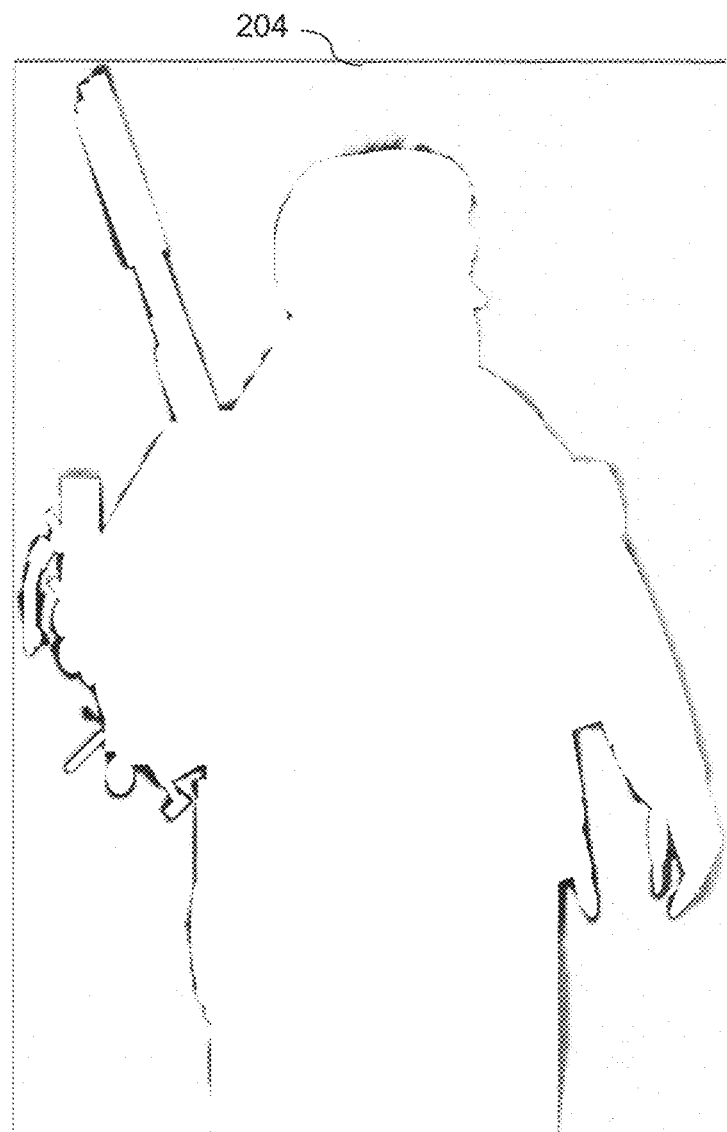
Figure 2C:

FIGS. 2A-2C illustrate examples of various image layers that may be received and/or generated by the authoring tool 102 illustrated in FIG. 1. FIG. 2A illustrates a first image layer 202, FIG. 2B illustrates a second image layer 204, and FIG. 2C illustrates a third image layer 206. These layers are provided merely as examples for ease of illustration. Various other types and quantities of layers may alternatively be utilized.

Figure 3A:
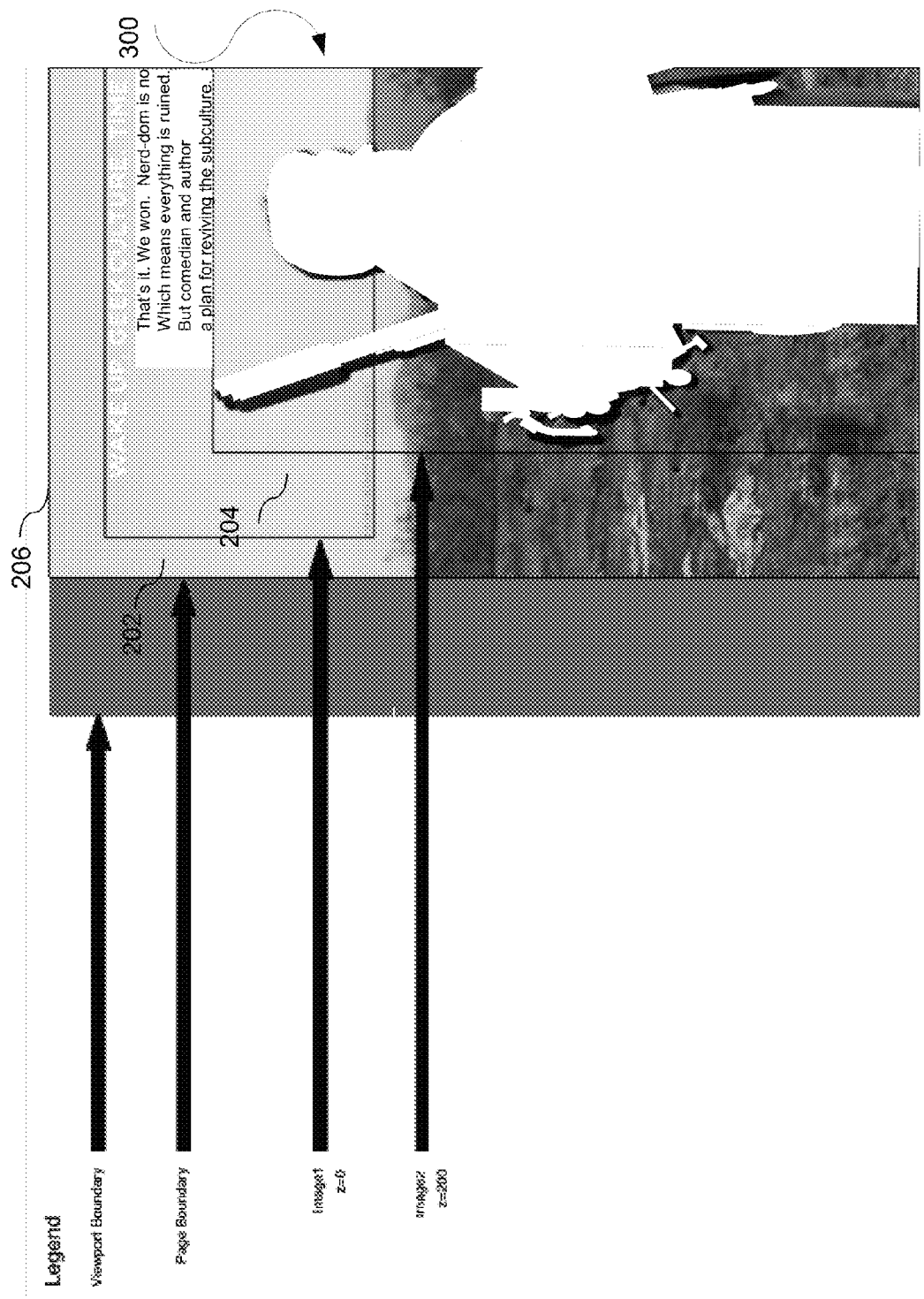
FIGS. 3A, 3B, and 3C illustrate examples of display windows relating to the image layers illustrated in FIGS. 2A-2C.
Figure 3B:
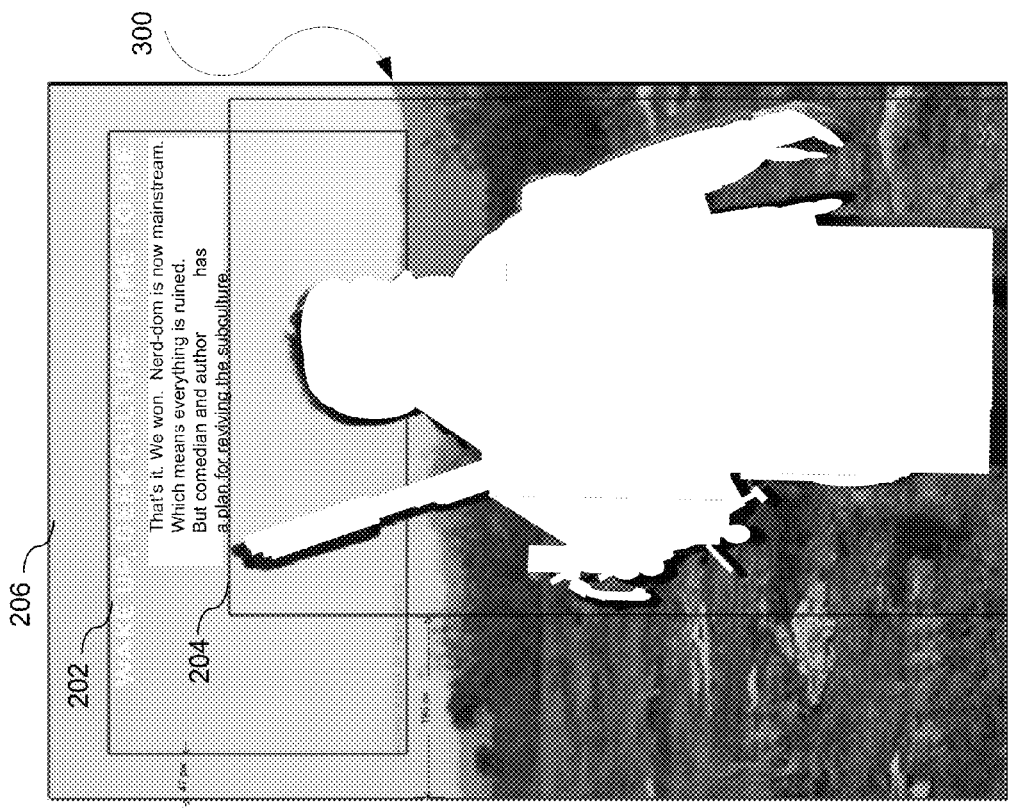
Figure 3C:
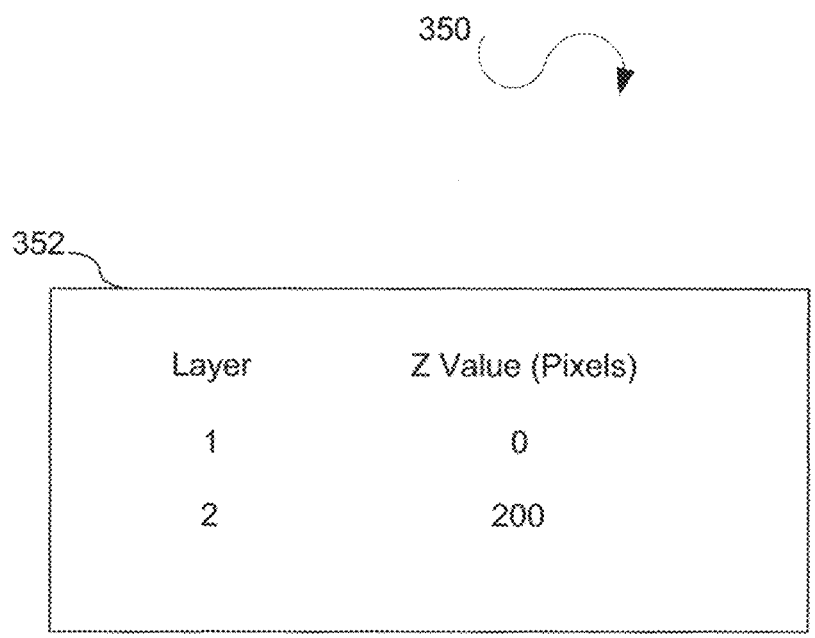

FIGS. 3A, 3B, and 3C illustrate examples of display windows relating to the image layers illustrated in FIGS. 2A-2C. For example, FIG. 3A illustrates a composed image 300, which may be displayed on the viewing device 106 illustrated in FIG. 1, that includes the individual layers illustrated in FIGS. 2A-2C. As an example, the composed image may be an image of a character with background scenery and text. The first image 202 may have a simulated depth of zero pixels. In other words, the first image 202 will not move with respect to the edge of a page boundary. A page boundary is the boundary of the authored content. A digital document may include multiple pages in either a horizontal or a vertical scroll. The viewport boundary in this instance is the same width and height as the page boundary. Accordingly, the pages will snap into view. The viewport boundary does not change, but the page boundary may change with respect to the viewport boundary as a scrolling motion is performed. The distance between the left edge of the first image 202 and the edge of the viewport boundary will remain constant irrespective of how much the user scrolls the page within the scrollable area of a display screen of the viewing device 106 as illustrated in FIG. 1. Further, the second image 204 may have a simulated depth of two hundred pixels. Accordingly, the second image 204 may move with respect to the viewport boundary. The parallax effect results from the different offsets of the different layers and scrolling of the page with those layers to generate those different offsets. The depth information may be automatically utilized to provide the parallax effect, which diminishes as the user reaches a zero scroll position, i.e., a position in which the page is placed fully in view of the viewport. The user scrolls the page with respect to the viewport boundary, and the image layers move relative to the page depending on the simulated depths of the image layers. In one embodiment, an offset may be a function of a scroll position, a simulated depth value, and a constant associated with a size of the page. The constant may be manually modified by an author utilizing the authoring tool to obtain the desired parallax effect. In one embodiment, an author may preview the content in a scrollable view so that the parallax effect may be viewed and modified.

Further, FIG. 3B illustrates the composed image 300 with measurement annotations. The composed image 300 is illustrated with no horizontal scroll. Without any scroll, a parallax effect has not yet been generated. As an example, the first image layer 202 has an authored x position of forty-seven pixels from the edge of the viewport boundary. As the simulated depth value for the first image layer 202 is zero pixels, the authored x position of forty-seven pixels from the edge of the viewport boundary will not change. Further, as an example, the second image layer 204 has an authored x position of one hundred ninety-five pixels from the viewport boundary. As the simulated depth value from the viewport boundary is two hundred pixels, the second image layer 204 may move with toward the viewport boundary. The illustrated z values are depth values.

In addition, FIG. 3C illustrates an image layer depth configuration 350, which may be displayed on the viewing device 106 illustrated in FIG. 1, that includes an image layer depth window 352. The image layer depth window 352 indicates the different layers and the corresponding depths along the z-axis. In one embodiment, the image layer depth window 352 simply displays the corresponding simulated depths. In another embodiment, the image layer depth window 352 allows the user to modify the simulated depth values.

The depth values may be calculated according to standard parallax methodologies. For example, a standard graphics program with parallax functionality may be utilized to calculate the depth values. Alternatively, a constant offset may be determined for each layer. That constant offset value may then be applied to the respective layer.

Figure 4A:
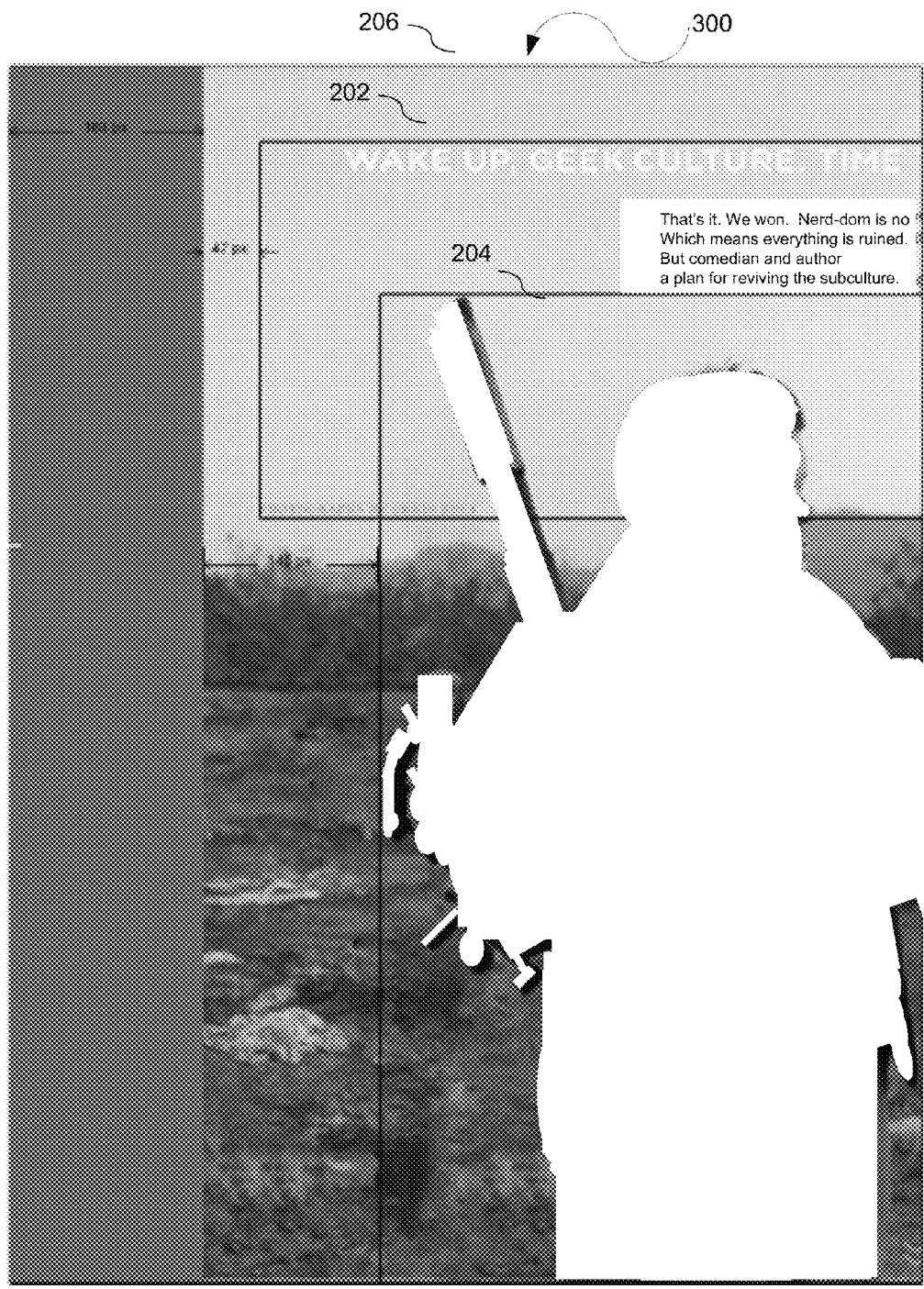
FIGS. 4A-4B illustrate examples of parallax images generated from the composed image illustrated in FIG. 3 based on user input with respect to the composed image.
Figure 4B:
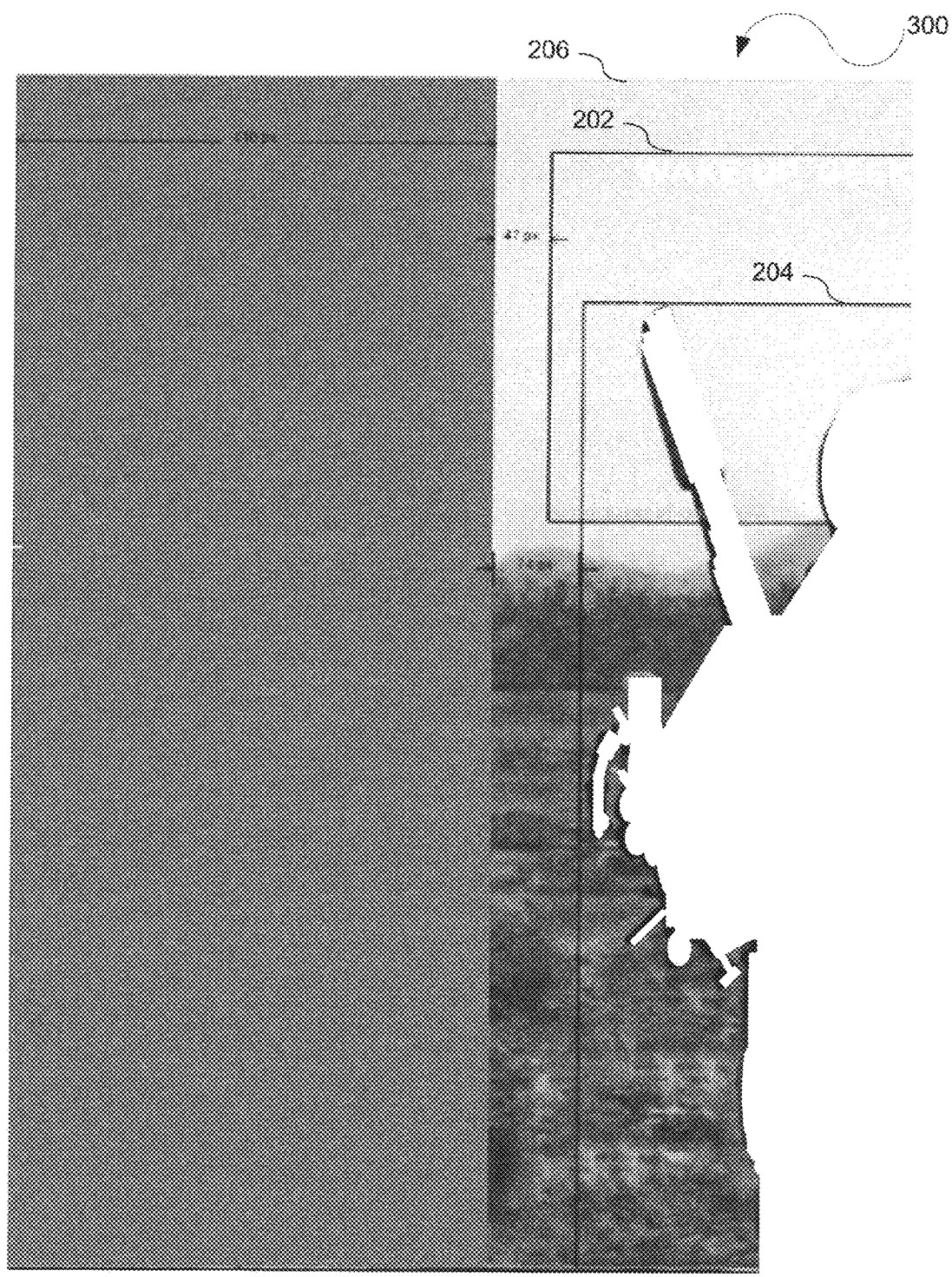

FIGS. 4A-4B illustrate examples of parallax images generated from the composed image 300 illustrated in FIG. 3 based on user input with respect to the composed image 300. FIG. 4A illustrates a parallax effect generated by a scroll movement of the composed image to the right of the viewport in the scrollable area. The first authored x position of the first image layer 202 does not change with respect to the edge of the viewport even though the entire image has moved one hundred sixty-three pixels to the right. Accordingly, the offset of the first image layer 202 is zero pixels. However, the second image layer 204 does move with respect to the viewport. For example, the left edge second image layer is offset to be a distance of one hundred forty-eight pixels from the right edge of the viewport instead of the original one hundred-ninety eight pixels. Accordingly, an offset of forty pixels was utilized. The different offsets between the first image layer 202 and the second image layer 204 generate a parallax effect after scroll movement of the composed image 300.

FIG. 4B illustrates a parallax effect generated by a scroll movement of the composed image further to the right of the viewport in the scrollable area than illustrated in FIG. 4A. The first authored x position of the first image layer 202 still does not change with respect to the edge of the viewport even though the entire image has moved four hundred ten pixels to the right. Accordingly, the offset of the first image layer 202 is zero pixels. However, the second image layer 204 does move further with respect to the viewport. For example, the left edge second image layer is offset to be a distance of seventy-four pixels from the right edge of the viewport instead of the original one hundred-ninety eight pixels. Accordingly, an offset of one hundred twenty-four pixels was utilized. The different offsets between the first image layer 202 and the second image layer 204 generate a parallax effect after scroll movement of the composed image 300.

Figure 5B:
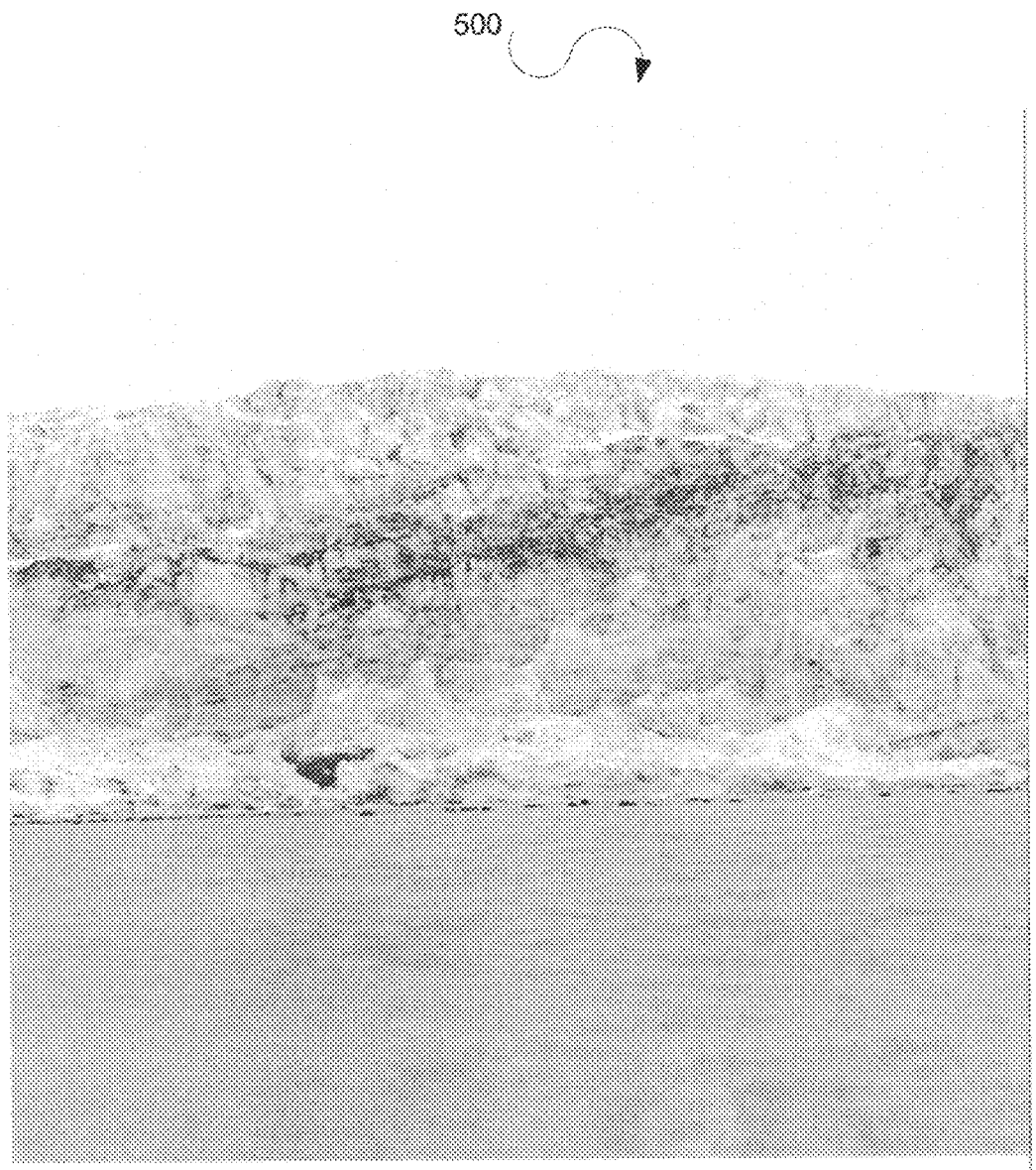
Figure 5C:
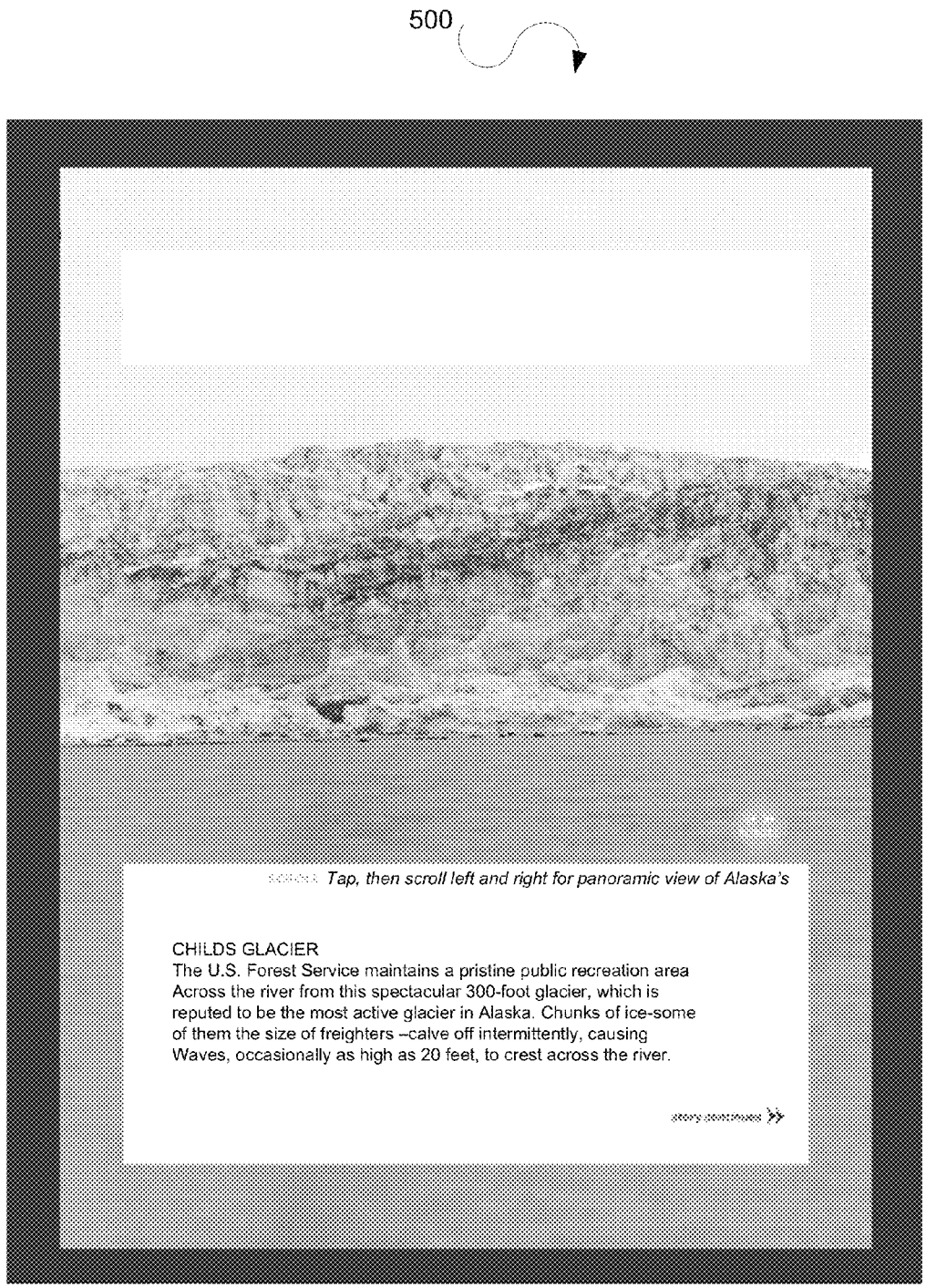

FIGS. 5A-5C illustrate a variety of other actions that may be performed with a composed image 500. A user may zoom in and out of the composed image 500, and the layers will offset differently based on the depth value and the zoom level. FIG. 5A illustrates the composed image 500 that provides an interactivity cue 502 that indicates an interactive image layer. As an example, the interactivity cue 502 may be a scroll symbol such as a circle and text that indicate a scrollable area. Alternatively, the interactivity cue may be a variety of other shapes with or without text.

FIG. 5B illustrates a zoomed version of the composed image 500 illustrated in FIG. 5A. As an example, a user may tap on the screen with his or her finger to enlarge the image layers of the image.

FIG. 5C illustrates a shrunken version of the composed image 500 illustrated in FIG. 5A. As an example, a user may double tap on the screen with his or her finger to enlarge the image layers of the image.

The parallax effect may be utilized to indicate interactive elements on what would otherwise be a static print design. In other words, parallax is utilized to indicate divisions in content that would otherwise look static. Further, the author does not have to explicitly create an animation, e.g., a pulsing button.

Figure 6:
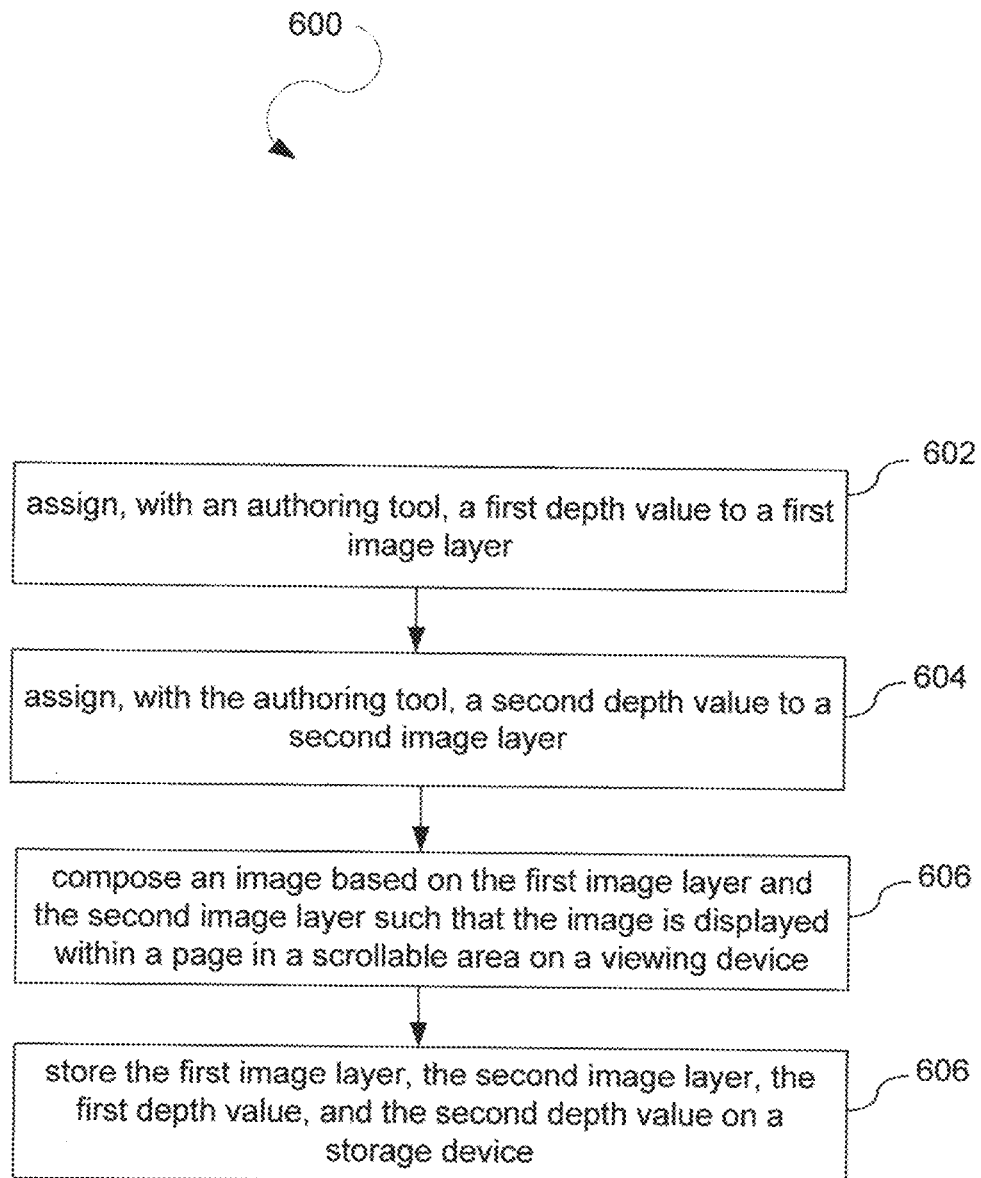
FIG. 6 illustrates a process that may be utilized for generation of a parallax image.

FIG. 6 illustrates a process 600 that may be utilized for generation of a parallax image. At a process block 602, the process 600 assigns, with an authoring tool, a first depth value to a first image layer, the first depth value being a first simulated distance from a user. Further, at a process block 604, the process 600 assigns, with the authoring tool, a second depth value to a second image layer, the second depth value being a second simulated distance from the user. In addition, at a process block 606, the process 600 composes an image based on the first image layer and the second image layer such that the image is displayed within a page in a scrollable area on a viewing device. The first depth value is utilized to generate a first offset value from a first static position of the first image layer and the second depth value being utilized to generate a second offset value from a second static position of the second image layer based upon a scroll position of the page with respect to a target location in the scrollable area to create a parallax effect. The target location is the location where the author intended the image layers to be on the page. At a process block 608, the process 600 also stores the first image layer, the second image layer, the first depth value, and the second depth value on a storage device. Although the process 600 provides for two layers, more than two layers may be utilized.

In another embodiment, if the user scrolls or swipes the image more quickly, the layers get further apart, e.g., the top layer scrolls even more quickly than it normally would based on the parallax effect. As an example, this configuration may be utilized with a touch enable device.

Figure 7:
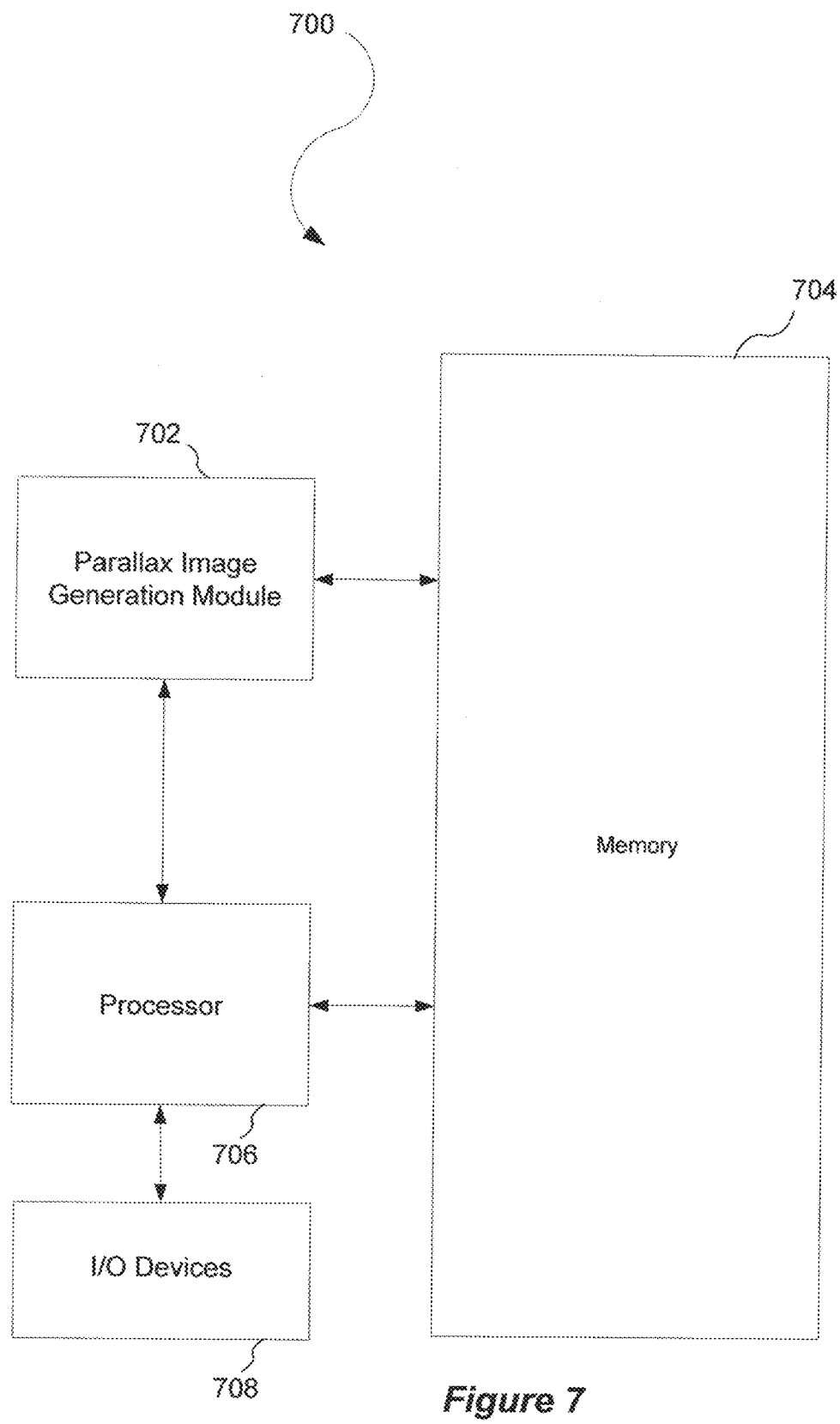
FIG. 7 illustrates a system configuration that may be utilized for parallax image generation.

FIG. 7 illustrates a system configuration 700 that may be utilized for parallax image generation. In one embodiment, a parallax image generation module 702 interacts with a memory 704 and a processor 706. In one embodiment, the system configuration 700 is suitable for storing and/or executing program code and is implemented using a general purpose computer or any other hardware equivalents. The processor 706 is coupled, either directly or indirectly, to the memory 704 through a system bus. The memory 704 can include local memory employed during actual execution of the program code, bulk storage, and/or cache memories which provide temporary storage of at least some program code in order to reduce the number of times code must be retrieved from bulk storage during execution.

The Input/Output ("I/O") devices 708 can be coupled directly to the system configuration 700 or through intervening input/output controllers. Further, the I/O devices 708 may include a keyboard, a keypad, a mouse, a microphone for capturing speech commands, a pointing device, and other user input devices that will be recognized by one of ordinary skill in the art. Further, the I/O devices 708 may include output devices such as a printer, display screen, or the like. Further, the I/O devices 708 may include a receiver, transmitter, speaker, display, image capture sensor, biometric sensor, etc. In addition, the I/O devices 708 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 700 to enable the system configuration 700 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes, systems, and computer program products described herein may also be applied in other types of processes and systems. Those skilled in the art will appreciate that the various adaptations and modifications of the embodiments of the processes, systems, and computer program products described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer useable storage memory having executable program instructions stored thereon that, responsive to execution by a computing device, cause the computing device to perform operations comprising:

assigning, with an authoring tool, a first depth value to a first image layer, the first depth value being a first simulated distance from a user;

assigning, with the authoring tool, a second depth value to a second image layer, the second depth value being a second simulated distance from the user;

composing, with the authoring tool, an image based on the first image layer and the second image layer to display the image within a page in a scrollable area on a viewing device;

generating, with a parallax image generation module, a first offset value from the first depth value and a static position of the first image layer; and generating, with a parallax image generation module, a second offset value from the second depth value and a static position of the second image layer based on a scroll position of the page with respect to a target location in the scrollable area to create a parallax effect.

2. The computer useable storage memory of claim 1, wherein the first simulated distance is measured along a z-axis.

3. The computer useable storage memory of claim 1, wherein the second simulated distance is measured along a z-axis.

4. The computer useable storage memory of claim 1, further comprising selectively scaling the first image layer according to the first depth value and the second image layer according to the second depth value to simulate depth.

5. The computer useable storage memory of claim 1, wherein the first image layer is interactive and the second image layer is non-interactive content.

6. The computer useable storage memory of claim 1, wherein the first image layer is a metatextual visual cue and the second image layer is non-interactive content.

7. The computer useable storage memory of claim 1, wherein the image is positioned within a digital magazine.

8. A method comprising:
executing a parallax image generation module on a processor of a computing device to perform:
receiving a first depth value for a first image layer, the first depth value being a first simulated distance from a user;
receiving a second depth value for a second image layer, the second depth value being a second simulated distance from the user;
receiving a composed image, comprising the first image layer and the second image layer configured for display within a page in a scrollable area on a viewing device;
generating a first offset value from the first depth value and a static position of the first image layer; and
generating a second offset value from the second depth value and a static position of the second image layer based on a scroll position of the page with respect to a target location in the scrollable area to create a parallax effect.

9. The method of claim 8, wherein the first simulated distance is measured along a z-axis.

10. The method of claim 8, wherein the second simulated distance is measured along a z-axis.

11. The method of claim 8, wherein a zoom command of the image results in selectively scaling the first image layer according to the first depth value and the second image layer according to the second depth value to simulate depth.

12. The method of claim 8, wherein the first image layer is interactive content and the second image layer is non-interactive content.

13. The method of claim 8, wherein the first image layer is a metatextual visual cue and the second image layer is non-interactive content.

14. The method of claim 8, wherein the image is positioned within a digital magazine.

15. A system comprising:
a memory configured to store an image that is displayable, the image having a first image layer and a second image layer;
one or more processors to implement a parallax image generation module that is configured to:
receive a first depth value for a first image layer, the first depth value being a first simulated distance from a user viewing the image when displayed;
receive a second depth value for a second image layer, the second depth value being a second simulated distance from the user viewing the image when displayed;
receive a composed image, comprising the first image layer and the second image layer, and configured for display within a scrollable area of a page;
generate a first offset value from the first depth value and a static position of the first image layer; and
generate a second offset value from the second depth value and a static position of the second image layer based on a scroll position of the page with respect to a target location in the scrollable area to create a parallax effect.

16. The system of claim 15, wherein the first simulated distance is measured along a z-axis.

17. The system of claim 15, wherein the second simulated distance is measured along a z-axis.

18. The system of claim 15, further comprising selectively scaling the first image layer according to the first depth value and the second image layer according to the second depth value to simulate depth.

19. The system of claim 15, wherein the first image layer is interactive content and the second image layer is non-interactive content.

20. The system of claim 15, wherein the first image layer is a metatextual visual cue and the second image layer is non-interactive content.

* * * * *

UNITED STATES PATENT AND TRADEMARK OFFICE
CERTIFICATE OF CORRECTION

| | | |
|---|---|---|
| PATENT NO. | : 8,872,813 B2 | Page 1 of 1 |
| APPLICATION NO. | : 13/225158 | |
| DATED | : October 28, 2014 | |
| INVENTOR(S) | : Walton et al. | |

It is certified that error appears in the above-identified patent and that said Letters Patent is hereby corrected as shown below:

In the claim

Column 9, Line 30, Claim 5, after "...layer is interactive", insert -- content --, therefor.

Signed and Sealed this
Twenty-fourth Day of March, 2015

Michelle K. Lee
*Director of the United States Patent and Trademark Office*